US009287998B2

(12) United States Patent
Philips et al.

(10) Patent No.: US 9,287,998 B2
(45) Date of Patent: Mar. 15, 2016

(54) BROADCAST DEVICE FOR BROADCASTING PAYLOAD DATA, NETWORK DEVICE FOR RECEIVING BROADCASTED PAYLOAD DATA AND METHOD FOR INITIATING BROADCASTING PAYLOAD DATA

(75) Inventors: Norbert Philips, Bertem (BE); Steven Mark Thoen, Leuven (BE); Valentin Claessens, Sint-Truiden (BE)

(73) Assignee: NXP B.V., Eindhoven (NL)

( * ) Notice: Subject to any disclaimer, the term of this patent is extended or adjusted under 35 U.S.C. 154(b) by 945 days.

(21) Appl. No.: 13/218,367

(22) Filed: Aug. 25, 2011

(65) Prior Publication Data

US 2012/0051278 A1 Mar. 1, 2012

(30) Foreign Application Priority Data

Aug. 25, 2010 (EP) .................................... 10174066

(51) Int. Cl.

| | |
|---|---|
| ***H04L 12/28*** | (2006.01) |
| ***H04H 20/61*** | (2008.01) |
| *H04J 1/16* | (2006.01) |
| *H04H 20/16* | (2008.01) |
| *H04H 60/40* | (2008.01) |

(Continued)

(52) U.S. Cl.

CPC ............... *H04H 20/61* (2013.01); *H04H 20/16* (2013.01); *H04H 60/40* (2013.01); *H04H 60/80* (2013.01); *H04R 25/554* (2013.01)

(58) Field of Classification Search

CPC .............. H04L 12/189; H04L 27/2647; H04L 29/06027; H04L 29/06326; H04W 4/06; H04W 48/16; H04W 72/005; H04W 72/0446; H04W 84/08; H04W 84/12; H04W 88/08; H04N 5/4401

USPC .......................... 370/329, 337, 442, 487, 503

See application file for complete search history.

(56) References Cited

U.S. PATENT DOCUMENTS

| | | | | |
|---|---|---|---|---|
| 8,165,457 | B2 * | 4/2012 | Shibutani et al. ............ | 386/330 |
| 8,208,500 | B2 | 6/2012 | Philips et al. | |
| 2004/0213214 | A1 * | 10/2004 | Jung et al. .................... | 370/352 |

(Continued)

FOREIGN PATENT DOCUMENTS

| | | | | |
|---|---|---|---|---|
| EP | 1 659 715 A2 | 5/2006 | | |
| EP | 2424304 A1 | 2/2012 | | |
| WO | WO 2009/110714 A1 * | 9/2009 | .............. | H04B 7/26 |

OTHER PUBLICATIONS

Gupta, N. "The Eureka 147 Digital Audio Broadcasting System Adapted to the US", Massachusetts Institute of Technology, retrieved from the internet at: http://dspace.mit.edu/bitstream/handle/1721.1/38795/35332950.pdf?sequence=1, pp. 67-77 (Jun. 11, 1996).

(Continued)

*Primary Examiner* — John Pezzlo

(57) ABSTRACT

A method is provided for initiating broadcasting payload data, the method comprising: wirelessly transmitting a message from a broadcast device to a network device, the message containing configuration information of the broadcasting; receiving the message at the network device and extracting the configuration information at the network device; and configuring the network device for receiving at least a part of the broadcasted payload data based on the configuration information. Further, a broadcast device for broadcasting payload data and a network device for receiving broadcasted payload data are provided.

18 Claims, 4 Drawing Sheets

(51) Int. Cl.
*H04H 60/80* (2008.01)
*H04R 25/00* (2006.01)

(56) References Cited

U.S. PATENT DOCUMENTS

| | | | | |
|---|---|---|---|---|
| 2005/0074025 | A1* | 4/2005 | Shao et al. | 370/461 |
| 2006/0009247 | A1* | 1/2006 | Kelley et al. | 455/515 |
| 2006/0166667 | A1* | 7/2006 | Grilli et al. | 455/435.1 |
| 2007/0086601 | A1 | 4/2007 | Mitchler | |
| 2007/0258428 | A1* | 11/2007 | Zuniga et al. | 370/338 |
| 2007/0274550 | A1 | 11/2007 | Baechler et al. | |
| 2009/0022136 | A1* | 1/2009 | Joshi et al. | 370/348 |
| 2009/0041129 | A1* | 2/2009 | Suh | H04H 20/55 375/240.25 |
| 2009/0251616 | A1* | 10/2009 | Seo et al. | 348/726 |
| 2010/0008527 | A1 | 1/2010 | Gottschalk et al. | |
| 2011/0051848 | A1* | 3/2011 | Yuk et al. | 375/316 |
| 2011/0158264 | A1 | 6/2011 | Philips et al. | |
| 2012/0033620 | A1* | 2/2012 | Thoen et al. | 370/329 |
| 2012/0188998 | A1 | 7/2012 | Philips et al. | |

OTHER PUBLICATIONS

"Radio Broadcasting Systems; Digital Audio Broadcasting (DAB) to Mobile, Portable and Fixed Receivers", European Broadcasting Union, ETSI Standards, vol. BC, No. V1.4.1 pp. 1-198 (Jun. 1, 2006).
"NxH1300 Network Protocol Description Rev. 07" NXP Semiconductors, 62 pgs. (Apr. 10, 2009).
Extended European Search Report for Patent Appln. No. 10174066.0 (Dec. 20, 2010).
Michael Kornfeld et al: "DVB-H and IP Datacast-Broadcast to Handheld Devices", IEEE Transactions on Broadcasting, IEEE Service Center, iscataway, NJ, US, vol. 53, No. 1, Mar. 1, 2007, pp. 161-170, XP011172029, ISSN: 0018-9316, DOI: 10.1109/TBC.2006.889210.

* cited by examiner

BROADCAST DEVICE FOR BROADCASTING PAYLOAD DATA, NETWORK DEVICE FOR RECEIVING BROADCASTED PAYLOAD DATA AND METHOD FOR INITIATING BROADCASTING PAYLOAD DATA

This application claims the priority under 35 U.S.C. §119 of European patent application no. 10174066.0, filed on Aug. 25, 2010, the contents of which are incorporated by reference herein.

FIELD OF THE INVENTION

The present invention relates to a method for initiating broadcasting payload data, to a method for preparing broadcasting payload data, to a method for preparing receiving broadcast payload data, to a broadcast device for broadcasting payload data and to a network device for receiving broadcasted payload data. In particular, the present invention relates to a method and to devices for initiating broadcasting payload data, wherein a message is transmitted prior to broadcasting the payload data, in which message configuration information of the broadcasting is contained.

BACKGROUND OF THE INVENTION

In a conventional wireless network like Bluetooth or ZigBee a wireless device can only join a network and communicate with other devices in the network if it has a bi-directional communication link with at least one network device in this network. Magnetic induction (MI) based wireless devices, as typically used in wireless hearing aids, may have a limited operating range (typically 20 cm) due to battery lifetime requirements of the network devices. On the other hand an MI-based audio broadcast device like an MP3 player can (and should) have a higher transmit range (typically 1 m) so that the wireless network devices can still receive the transmitted data stream, when the broadcast device is placed outside the transmission range of the network devices, e.g. in a pocket of the person wearing the hearing aid(s) at his or her ears. Conventional network protocols can not handle the communication between such a broadcast device and devices operating in a wireless network.

In a configuration or situation comprising one or more network devices communicating with each other and comprising a broadcast device being placed out of transmission range of the network devices, the broadcast device may want to broadcast payload data to be received by the network device or network devices having already established a wireless communication network. According to a conventional method the broadcast device (for example a MI-based (audio) broadcast device) can not join a wireless network, when it is located outside the transmit range of the network devices. Its join request may be received by the network manager (one of the network devices), but the broadcast device may not be able to receive a join grant, since it is located outside the transmit range of the network devices. According to a conventional method, the broadcast device starts transmitting data, in particular payload data, without any prior signaling. The network devices may receive the transmitted data and this transmission may interfere with the ongoing communication in the wireless network between the network devices. After a given timeout period the network devices may, according to a conventional method, conclude that the interference is permanent and they will disable all network communication. In a next step according to the conventional method each network device may try to synchronize with the transmitted data of the broadcast device. Once synchronized, processing of the received data (e.g. audio playback) may start. With such a conventional method the communication breakdown period (communication of the network devices with each other) may be unacceptably high.

SUMMARY OF THE INVENTION

Therefore, there may be a need for a method for broadcasting payload data by a broadcast device which enables faster switching over from ongoing communication within a network between network devices to a configuration, wherein the network devices are able to receive the broadcasted payload data (and may nevertheless continue communicating with each other). In particular, there may be a need for a method for initiating broadcasting payload data and for devices, such as a broadcast device and a network device, which enable more effective switching over from a communication session between different network devices to (additionally) receiving broadcasted payload data at the network devices.

According to an embodiment a method for synchronizing devices in a wireless network with a broadcast device is provided, wherein the broadcast device enters an operating area of the network, wherein a fast switch over between the ongoing communication and the reception of the new broadcast data stream is enabled. In particular, the method may be applied in a wireless network with devices having an asymmetrical link, i.e. the broadcast device may only be able to transmit data towards the network devices but the broadcast device may not be able to receive data transmitted from the network devices, since the broadcast device is located outside the transmission range of all of the network devices (or all network devices are located outside the receive range of the broadcast device related to their transmit power). Thus, in this situation the broadcast device may not be able to receive a response from the network devices upon sending a message from the broadcast device to the network devices.

According to an embodiment a method for initiating broadcasting payload data is provided, wherein the method comprises wirelessly transmitting a message (in particular a short message, comprising much less data than data comprised in the payload data) from a broadcast device (such as for example a wireless remote control, a computing device, a music player, a mobile phone or a medical communication device) to a network device (such as a hearing aid, or another device located at or implanted in a living organism), the message containing configuration information of the broadcasting; receiving the message (for example via an antenna, a demodulator and/or a processor) at the network device and extracting (such as by processing, decoding and/or decrypting) the configuration information at the network device; and configuring (in particular comprising preparing, adapting, instructing) the network device for receiving at least a part of the payload data based on the configuration information.

The broadcast device may use a MI-based technology (magnetic induction based technology) or a conventional transmission of radio electromagnetic waves by radio frequency technology or any other transmission method for transmitting data in a wireless manner. In particular, the broadcast device may have a transmission range which is larger (such as by a factor between 2 and 100, in particular by a factor in between 5 and 10) than the transmission range of the network devices. When the broadcast device intends to start a broadcast session, i.e. broadcast payload data, the broadcasting may be announced by a message containing the configuration information. This message may be as short as possible but long enough to enable message detection (reception) and decoding and/or decrypting by devices within the transmit range of the broadcast device. The message may contain a dedicated training sequence to enable fast detection and synchronization by one or more network devices located within the transmission range of the broadcast device.

According to an embodiment the network communication between different network devices within the network (with the broadcast device located out of their transmission range) may be performed according to a transmission frame structure (which might also be referred to as a superframe structure) according to which structure the actual transmission frames containing communication messages with payload data are successively transmitted by the different network devices comprised in the network. Optionally, the superframe structure may comprise a number of timeslots and the communication messages may have a length of one or more timeslots. Optionally, the start of a transmission frame (superframe) may be indicated by a beacon message that is transmitted by one of the network devices, typically (starting) in timeslot 0 of the superframe. The short message transmitted by the broadcast device may be detected during empty timeslots within the transmission frames used in the wireless network. In case this transmission frame structure is fully used (all timeslots are occupied), the power with which the (short) message is transmitted should be high enough to disturb (shortly) the ongoing communication between different network devices within the network and to enable detection of the message by at least one device of the wireless network.

The configuration information may comprise the description of a new transmission frame structure (the broadcast superframe structure) that will be used for broadcasting the payload data and data indicative of a time when the broadcast of payload data according to this transmission frame structure will start. The broadcast device announces its presence by broadcasting the (short) message, wherein the message may also comprise information about the upcoming data streaming sessions, such as a MP3-broadcasting.

The transmission power of the message may be high enough such that the network device may receive the message, even if this network device is currently communicating with another network device in the wireless network. In particular, the message transmitted by the broadcast device may disturb or interfere for a short time period with the ongoing communication within the network between different network devices. However, when a short message is used, this disturbance may be only of a short duration (which may typically be in a range of 10 ms to 100 ms). The network device may be in particular adapted to extract the configuration information, since it may have (or may be adapted to have) knowledge about the structure and semantics of the (short) message transmitted by the broadcast device. In particular, the network device may be adapted (such as programmed or configured) to extract particular configuration properties comprised in the (short) message transmitted by the broadcast device.

The configuring of the network device may for example comprise adjusting a reception frequency of a data reception, configuring a schedule for receiving (part of) the broadcasted payload data according to the broadcast transmission frame structure, running a particular program for decoding and/or decrypting the received message, analyzing the data comprised in the message, and assigning particular variables with particular values comprised in the extracted message. The configuring of the network device may in particular comprise computationally configuring the network device without requiring changing the physical constitution of the network device. After configuring the network device, the network device may be enabled to receive at least part of the payload data which may be transmitted from the broadcast device after the broadcast device has transmitted the (short) message. In particular, the (short) message may not comprise any of the broadcast data, but the payload data are only transmitted a time period (offset time) after having sent the (short) message. Thereby, the network device may be appropriately configured in order to receive the broadcasted payload data. In particular, the network device may stop a communication with another network device upon receiving the (short) message transmitted from the broadcast device.

According to an embodiment the configuration information comprises information indicative of a start time at which the broadcast starts. The information indicative of a start time may for example comprise an absolute time value or a time offset or a timeout period which may indicate at how much time after transmitting the short message the broadcasting of payload data will start. The information indicative of a start time may be structured or represented in any manner, or in any units, such as in milliseconds or seconds, or symbol periods or any other reference unit that is known by both the broadcast device and the network devices. In fact, the broadcast device may start broadcasting payload data at a start time which is derivable from the configuration information. Thereby, the network device may be appropriately prepared to expect broadcasting payload data at the start time. Thereby, it may be avoided that the network device misses some of the payload data. The start time may be represented by a particular timeout period after the transmission of the message such that the network device or the network devices may have enough time for configuring them, to prepare them for receiving the payload data. The timeout period may depend on a time interval needed by the different devices in the network to stop ongoing communication and to get reconfigured for receiving (part of) the broadcasted payload data. It may for example be as low as 1 second, or between 0.1 s and 1.0 s. When the timeout period after transmitting the (short) message has elapsed, the broadcast device may start transmitting frames comprising the payload data.

Optionally, a broadcast transmission frame (broadcast superframe) may also contain a secondary beacon with information on the broadcast transmission frame structure. A secondary beacon may be a beacon which is transmitted by a broadcast device that has not joined to the network. The secondary beacon may in particular be transmitted in a timeslot different from timeslot 0, since timeslot 0 may be reserved for a primary beacon which may be transmitted by network devices. The information contained in the secondary beacon can be used by network devices that have not received the (short) message, announcing the broadcast session, and/or by other devices that have not joined the network.

The (short) message transmitted from the broadcast device may also be referred to as a blaster frame. In particular, the short message or blaster frame may not be synchronized with the transmission frames of the ongoing communication between different network devices of the network.

According to an embodiment the method for initiating broadcasting payload data reduces a time of interference to an ongoing communication in the wireless network and may accelerate switch over to the reception of data from the broadcast device to be faster than according to conventional methods. The timeout period may also be referred to as time offset in the context of the present application.

According to an embodiment the configuration information comprises information indicative of a transmission frame (superframe) structure defining a structure of communication messages according to which the payload data are to be broadcasted. A transmission frame (superframe) structure definition may comprise a number of timeslots (for example 256 timeslots) within which different types of communication messages containing payload data may be transmitted. Thereby, the structure of the different types of communication messages comprised in the timeslots may be defined by the transmission frame structure and may be constant. However, the data content of the different types of communication messages comprised in the timeslots may vary from the transmission of one transmission frame to the transmission of a next (following) transmission frame.

In particular, the start time, the timeout period or the time offset may enable the network devices to synchronize themselves with the broadcast device. Thus, they may be configured to expect at a particular time communication messages containing broadcast data transmitted by the broadcast device which are structured according to the transmission frame structure. In particular, the configuration information may comprise a description of the transmission frame structure which may be used or which will be used for transmitting the payload data and thus performing broadcasting the payload data. Based on the configuration information, in particular based on the description of the transmission frame structure, the receiving network devices may know when they may have to terminate their current communication sessions (communication activity to other network devices) and how to synchronize with the broadcast device.

According to an embodiment the transmission frame structure is indicative of the number of timeslots per superframe, of the timeslots that will be used by the broadcast device to transmit the broadcast data, and of the time intervals (in particular within the transmission frames) at which the communication messages with payload data are to be broadcasted by the broadcast device. The transmission frames may be repetitively transmitted according to this transmission frame structure. In particular, the transmission frame structure may be indicative of one or more particular timeslots within the transmission frame structure (and thus indicative of one or more particular timeslots within each of the transmission frames to be transmitted) at which the payload data are to be broadcasted by the broadcast device. Thus, the broadcasted payload data may not completely fill all timeslots comprised in the transmission frames (superframes), but may only fill a particular fraction of timeslots, such as 10%-80% of the timeslots comprised in the transmission frame structure. Remaining timeslots not occupied by the payload data may be used by other devices for other purposes, such as for further communication messages between different network devices in the network. Thereby, it may be possible that network communication between different network devices is enabled and that simultaneously receiving the broadcasted payload data is enabled. Thereby, the method facilitates broadcasting and communication at the same time.

According to an embodiment the method for initiating broadcasting payload data further comprises establishing a wireless communication between the network device and another network device according to the broadcast transmission frame structure. Thereby, the wireless communication may be performed by making use of the same transmission frame structure as used for broadcasting the payload data. In particular, the transmission frame structure may exclusively be defined by the broadcast device, the network device or network devices having no influence on the transmission frame structure. Thereby, synchronizing of all network devices with the broadcast device may be achieved. In particular, the broadcast device would not even be able to receive (or be aware of) a previously used transmission frame structure, since the broadcast device may be out of the transmission range of the network devices.

According to an embodiment configuring the network device comprises terminating a previous wireless communication with the other network device, the previous wireless communication having been performed according to a previous transmission frame structure different from the broadcast transmission frame structure. The previous wireless communication may have been disturbed by the transmitting the short message (blaster frame). Upon receiving the blaster frame transmitted by the broadcast device, the network device may terminate the previous wireless communication after a particular time interval to properly terminate the previous wireless communication. The previous wireless communication may have been performed according to the previous transmission frame structure defining communication message types and/or timeslots for previous transmission frames being used during the previous wireless communications. According to the previous transmission frame structure the network device may have been allocated particular previous timeslots (or at least one particular timeslot) within the previous transmission frame structure for transmitting communication messages to the other network device. In contrast, according to a new transmission (broadcast) frame structure, the network device may get allocated other timeslots for transmitting communication data to the other network device. In particular, a network manager may be involved in allocating different timeslots to different network devices within the (new) transmission frame structure. Thereby, the transmission frame structure may be imposed by the broadcast device such that the transmission frame structure is used by the broadcast device and for any future communication sessions between different network devices, provided the broadcast transmission frame structure has sufficient empty timeslots to enable these network communication sessions. The network manager device of the network may allocate the free timeslots to communication sessions between network devices.

According to an embodiment the wireless communication is established such as to utilize an unchanged network configuration that has been used for the previous wireless communication. The network configuration may for example comprise information on which network device or which network devices are members of the network and which network device may be network manager and which network device may function as a router for one or more other network devices. Further information in the network configuration may be included. In particular, the previous network configuration may have been stored in (or at) at least one of the network devices within the wireless network and may be made available to all other network devices in the network. Thus, according to an embodiment the network configuration is not changed from the previous network configuration, but the previous transmission frame structure is changed to the new (broadcast) transmission frame structure after receiving the message transmitted from the broadcast device and/or after configuring the network device.

According to an embodiment configuring the network device comprises synchronizing a clock of the network device according to the configuration information. In particular, the broadcast device, the network device and the other network device may each comprise its own clock. However, the different clocks and the different devices may not be synchronized due to inaccuracies requiring synchronizing the clocks from time to time. Synchronizing the clock of the network device enables the network device to properly receive (or expect reception of) the broadcast device payload data, thus in particular avoiding missing payload data. Further, also the other network device may be synchronized with the broadcast device according to which synchronizing also the transmission frames according to the broadcast transmission frame structure will be defined. Thus, also communication between the network device and the other network device in accordance with the broadcast transmission frame structure may be enabled.

In particular, the broadcast session of the broadcast device may be announced by the short message, followed by a transmission free gap (timeout period, time offset) so that the network devices can prepare the switch over (during configuring them) while the ongoing communication sessions continue without interference. When the timeout period expires, the broadcast device and the network devices may switch synchronously their operating mode. Thereby, minimum interference on the ongoing communication is achieved, when a broadcast device announces the start of a broadcast session. Further, the broadcast device and the network device or network devices may change their reconfiguration synchronously. Further, the silent period (timeout period, time offset) between both operating modes may be made considerably shorter than according to conventional methods.

In particular, the configuration information may comprise information indicative of a length of a transmission frame being used for transmitting communication messages with payload data according to the transmission frame structure. Further, the transmission frame structure may be indicative of one or more time intervals (or timeslots) within the transmission frames at which the payload data are to be broadcasted by the broadcast device.

According to an embodiment the broadcast device is located outside a transmission range of the network device into which the network device is capable to wirelessly transmit a communication signal to be detected by another network device and/or by the broadcast device. Thus, it may not be possible for the broadcast device to receive a response from the network device upon transmitting the (short) message. The (short) message may also be referred to as announcement message transmitted by the broadcast device in the context of the present application. Thereby, in this situation the method provides a simple and effective way to nevertheless synchronize the network devices with the broadcast device such that the network devices are disturbed only to a short extent in time during their communication and may properly receive (in particular completely) the payload data broadcasted by the broadcast device.

According to an embodiment a method for broadcasting payload data by a broadcast device is provided, wherein the method comprises initializing broadcasting the payload data according to an embodiment as described above and broadcasting the payload data from the broadcast device to the network device according to the configuration information. In particular, by initiating broadcasting the payload data the network devices may be appropriately configured such as to properly receive the payload data, while their ongoing communication is disturbed to a smaller extent than according to conventional methods. Thereby, the communication between network devices and the switch-over to receiving broadcasted payload data may be made more effective.

According to an embodiment broadcasting the payload data comprises broadcasting the payload data according to a transmission frame structure, the transmission of frames having a repetitive structure derivable from the configuration information, wherein in particular the payload data are transmitted at given time interval(s) within the (successive) transmission frames defined by the transmission frame structure.

In particular, the payload data may be transmitted at the start of one or more time intervals (also referred to as a timeslots) within the transmission frame structure. Thereby, transmission frames are successively arranged behind each other, every one of the transmission frames having a same structure according to the transmission frame structure. Thus, the payload data are exclusively transmitted within one or more time intervals (timeslots) within each transmission frame, having a same start time relative to the given transmission frame. As a result, broadcasting the payload data may be more efficient and the network devices may be appropriately enabled to receive the payload data.

It should be understood that any of the features (individually or in any combination) described with respect to the method for initiating broadcasting payload data may also (individually or in any combination) be applied to or used for a method for preparing broadcasting payload data, a method for preparing receiving payload data, a broadcast device for broadcasting payload data and a network device for receiving broadcasted payload data and also a system comprising a broadcast device for broadcasting payload data and at least one network device for receiving broadcasted payload data.

According to an embodiment a method for preparing broadcasting payload data is provided, wherein the method comprises wirelessly transmitting a message (also referred to as announcement message) from a broadcast device, the message containing configuration information of the broadcasting, wherein the message is receivable at a network device, wherein the configuration information is extractable at the network device and enabling the network device to be configured for receiving at least a part of the payload data based on the configuration information. In particular, the message may be configured such that it is receivable at the network device such that the configuration of the message is a restricting feature of the method for preparing broadcasting payload data. Further, the configuration information may be such that it is extractable at the network device and such that the network device is enabled (due to the message) to be configured for receiving at least a part of the payload data based on the configuration information. Thus, also the configuration information is configured such that the effect is achieved, thereby restricting the method for preparing broadcasting payload data.

According to an embodiment a method for preparing receiving payload data to be transmitted by broadcasting is provided, wherein the method comprises receiving a message at a network device, the message containing configuration information of the broadcasting; extracting the configuration information at the network device; and configuring the network device for receiving at least a part of the payload data based on the configuration information.

It should be understood that features (individually or in any combination) disclosed or described or mentioned with respect to a method for initiating broadcasting payload data, to a method for broadcasting payload data by a broadcast device, a method for preparing broadcasting payload data, and/or a method for preparing receiving payload data may be applied to (individually or in any combination) a broadcast device for broadcasting payload data and/or a network device for receiving broadcasted payload data.

According to an embodiment a broadcast device for broadcasting payload data is provided, wherein the broadcast device comprises a transmitter for wirelessly transmitting a message from the broadcast device to a network device, the message containing configuration information of the broadcasting, wherein the broadcast device is adapted to broadcast the payload data based on the configuration information. The broadcast device may be in particular a music player, such as an MP3-player, a remote control device, a medical monitoring device and/or a medical sensor device. The transmitter may comprise a transmitter for generating an electromagnetic wave and/or a magnetic induction signal. The transmitter may transmit within a region (transmit range) from 1 cm to 100 m, in particular within a range between 10 cm and 2 m. In particular, magnetic induction technology may be applied, wherein induction effects may dominate and the attenuation of the signal may be inversely proportional to the third power of the distance from the transmitter. This may in particular be applied to a so-called near-field zone which may range up to 1 m from the transmitter. In particular in the near-field zone the magnetic inductance technology may provide higher power efficiency than a radio frequency electromagnetic wave. In particular, the broadcast device may further comprise a processor for generating the message or reading the message from a storage medium.

According to an embodiment a network device for receiving broadcasted payload data is provided, wherein the network device comprises a receiver for receiving a message wirelessly transmitted from a broadcast device to the network device; a processor for extracting configuration information of the broadcasting contained within the message; and a configuration mechanism for configuring the network device for receiving the payload data broadcasted by the broadcast device based on the configuration information. The network device may in particular be a device housed in a casing carried at or within a living organism, in particular forming a hearing aid or an implanted medical sensor or medical actuator device. In particular, the broadcast device may have an energy source that has a capacity at least 10 times, in particular at least 100 times, greater than a capacity of an energy source of the network device. Thus, although the network device has a low capacity energy source, it may effectively receive payload data broadcasted by the broadcast device.

In particular, communication within the network and/or transmitting the announcement message from the broadcast device may be based on near-field magnetic induction communication or radio communication using electromagnetic waves. In particular, an asymmetrical link may be established between the broadcast device and at least one network device meaning that the broadcast device may only transmit a message towards at least one network device, but the broadcast device may never receive a message transmitted from any of the network devices. In particular, the network device may be an implanted device having a low capacity power source to transmit medical related data to or from a living organism. In particular, the network device may be remotely controlled by the broadcast device, such as for example for adjusting a volume of audio data.

According to an embodiment communication between different network devices within the network may be based on a time division multiple access architecture (TDMA).

According to an embodiment a computer-readable medium and/or a program element, in which a computer program of a method for initiating broadcasting payload data; of a method for broadcasting payload data by a broadcast device; of a method for preparing broadcasting payload data; and/or of a method for preparing receiving payload data to be transmitted by broadcasting is stored, which computer program, when being executed by a processor, is adapted to carry out or control the respective method as described above.

BRIEF DESCRIPTION OF THE DRAWINGS

Embodiments of the present invention are now described with reference to the accompanying drawings without limiting the scope of the present invention.

DESCRIPTION OF EMBODIMENTS

Figure 1:
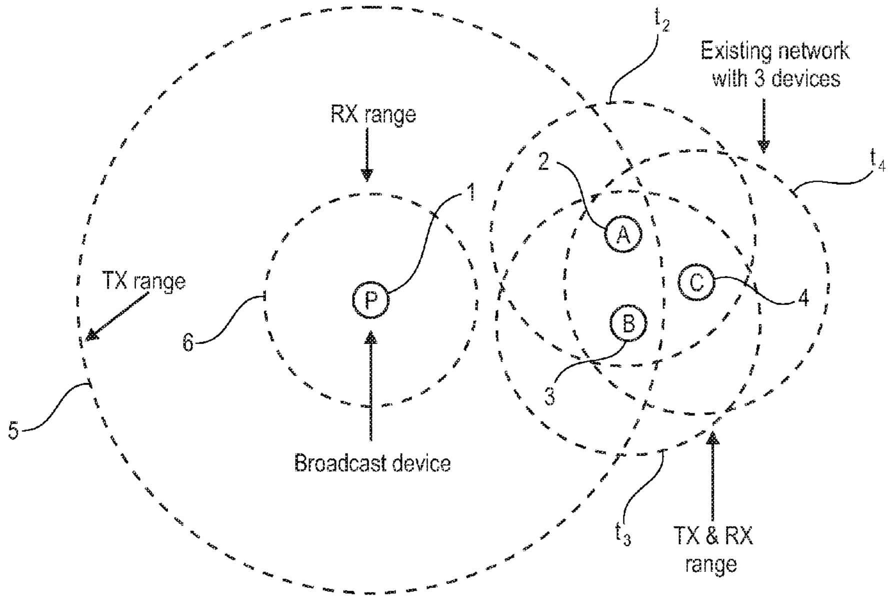
FIG. 1 schematically illustrates a situation comprising a broadcast device and several network devices, wherein an embodiment of a method may be applied.

FIG. 1 schematically illustrates a situation, in which a broadcast device 1 and network devices 2, 3 and 4 are involved. The broadcast device 1 (also called a broadcaster) is a blaster device with an asymmetrical link (the transmit range of device 1 is larger than the transmit range of devices 2, 3 and 4) that wants to transmit data for a longer period, e.g. an audio stream from an MP3-player. The transmit range of the broadcast device 1 is indicated as a circle 5 and the transmit ranges of devices 2, 3 and 4 are indicated by circles t2, t3 and t4. It is apparent that the transmit range 5 has a larger extent than the transmit ranges t2, t3 and t4. Further, it is apparent from FIG. 1 that the network devices 2 and 3 are located within the transmit range 5 of the broadcast device 1 such they may receive data transmitted from the broadcast device 1, while broadcast device 1 is located outside the transmit range of devices 2, 3 and 4.

Further, the network device 4 is located outside the transmit range 5 of the broadcast device 1 such that the network device 4 is not enabled to directly receive data transmitted by the broadcast device 1. However, using one of the devices 2 or 3 as a router, the network device 4 also may be able to (indirectly) receive data transmitted by broadcast device 1 via device 2 or 3 which may forward data received from the broadcast device 1 to device 4.

In particular, the network devices 2, 3 and 4 form a network, since their transmit and receive ranges (indicated as respective circles t2, t3, t4 around the network devices 2, 3 and 4) overlap in a region including all devices such that they can exchange messages between each other. According to an embodiment a method for initiating broadcasting payload data is performed in the situation illustrated in FIG. 1, in which the broadcast device 1 is not able to receive any message from any of the network devices 2, 3 and 4.

Figures 2A, 2B:
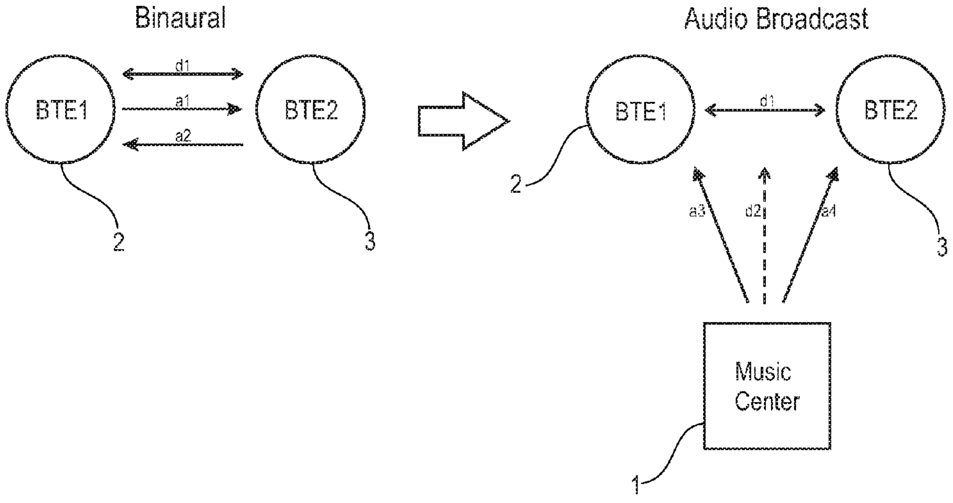
FIGS. 2A and 2B illustrate a wireless network and a wireless network receiving broadcasting data, respectively, according to embodiments of the present invention.

FIG. 2A illustrates a communication between the network devices 2 and 3. The network device 2 is enabled to (wirelessly) send an audio stream a1 to the network device 3 which may receive this stream. Further, the network device 3 may send an audio stream a2 to the network device 2 which is then received by the network device 2. In addition, there may be an additional bi-directional data channel d1 that can be used by both devices to exchange messages with each other. In particular, the communication between the network devices and the broadcasting by the broadcast device 1 uses a wireless technology, such as magnetic induction technology or radio frequency electromagnetic wave technology.

During a communication between the network devices 2 and 3 the broadcast device 1 may want to transmit data for a longer period, e.g. an audio stream from an MP3-player. Therefore, the broadcast device 1, such as a media player or in particular a music player, may send a message d2 towards the network devices 2 and 3, also using wireless communication technology.

As the transmit range t2, t3 of network devices 2 and 3 is smaller than the transmit range 5 of the broadcast device 1, the broadcast device 1 is not able to receive a response from none of the network devices 2 and 3 which receive the message from the broadcast device 1. Thus, the broadcast device 1 may for example not receive a confirmation from the network devices 2 and 3 that they are prepared or configured to receive payload data that the broadcast device 1 aims to transmit towards the network devices 2 and 3.

Figure 3:
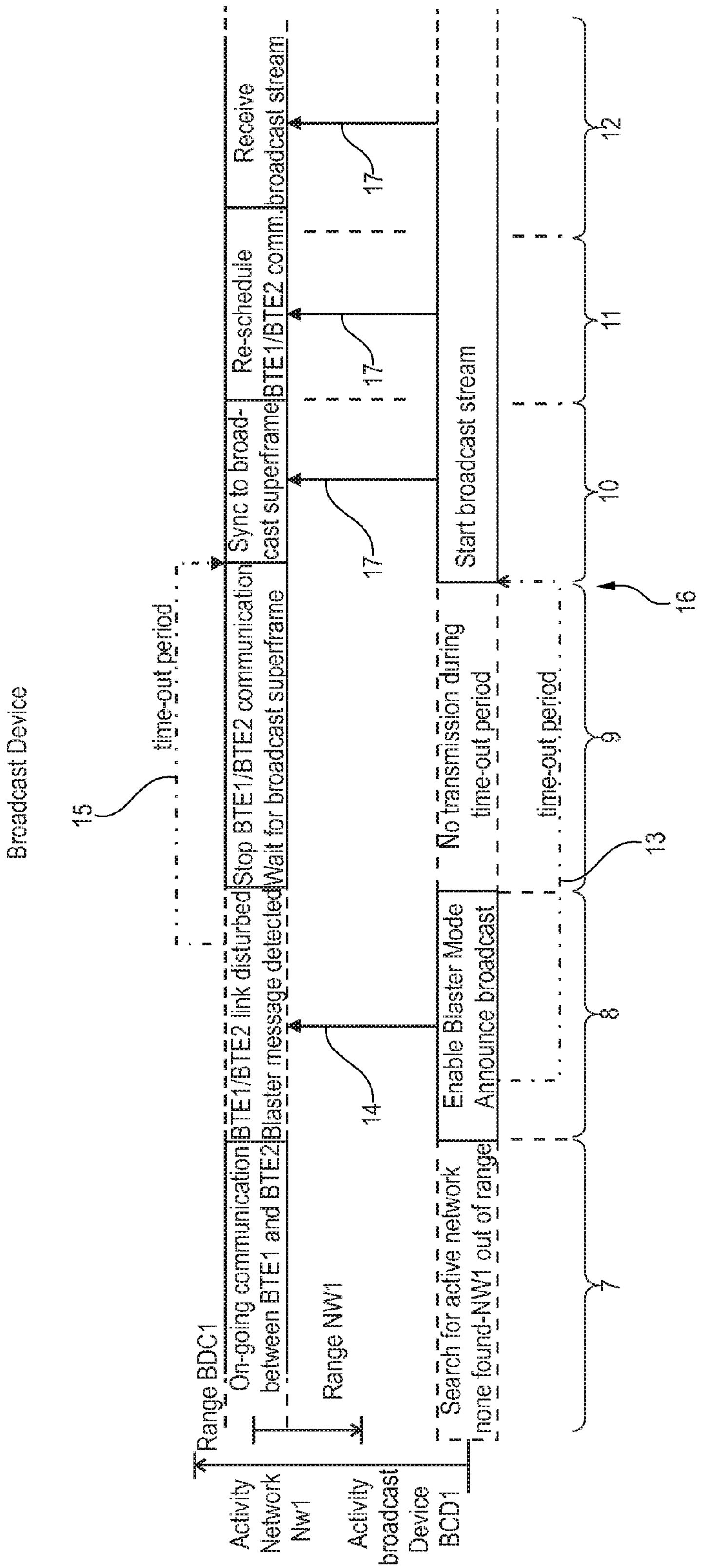
FIG. 3 schematically illustrates a method according to an embodiment.

Therefore, a method illustrated in FIG. 3 is performed according to an embodiment of the present invention. From left to right a propagation of time is indicated. The top row indicates activity of network devices, such as devices 2 and 3 within the wireless network. The bottom row indicates activity of the broadcast device 1. During a time interval 7 there is ongoing communication between the network devices 2 and 3. In the same time interval 7 the broadcast device 1 searches for an active network, which is unsuccessful, since the broadcast device 1 is in particular out of range for network 1 (NW1), in particular out of the transmit ranges of network devices 2 and 3.

During a time interval 8 the broadcast device 1 enables a blaster mode, wherein an announcement message is sent towards the network devices 2 and 3 which are still communicating with each other during the time interval 8. The announcement message sent within the time interval 8 comprises information regarding a timeout period 13 and/or 15 after which broadcasting the payload data, in particular broadcasting transmission frames comprising the broadcast data, will be started. The timeout period is indicated by reference sign 13. It also comprises information about the transmission frame structure that will be used to broadcast the payload data.

After having transmitted the announcement message 14 during time interval 8, the network devices 2 and 3 will terminate their communication sessions during a time interval 9 and will configure themselves (in particular synchronize themselves with the broadcast device 1) to appropriately receive (or prepare for reception of) the announced broadcasting of payload data. In particular, the network devices 2 and 3 will extract a timing information 15 and synchronization information enabling them to predict, when the transmission of payload data will start. The timeout period extracted by the network devices 2 and 3 is indicated with reference sign 15. At the time interval 10 the network devices 2 and 3 start listening to the broadcasted transmission frames (also referred to as broadcast superframes), having the frame structure that is announced in the announcement message. In particular, the transmission frame structure defines a content structure (in particular in terms of particular timeslots and communication message types transmitted within these timeslots) for the transmission frames to be transmitted by the broadcast device 1.

At a time point 16 (which is derivable from the announcement message 14) the broadcast device 1 starts broadcasting the transmission frames comprising the broadcast data according to the announced transmission frame structure. Due to the configuration information comprised in the announcement message 14 also the network devices 2 and 3 are aware of (or have extracted or computed) the starting time 16 and appropriately receive the transmission frames comprising the payload data within the time interval 10. During time intervals 11 and 12 and further time intervals not indicated in FIG. 3 the broadcast device 1 continues broadcasting the payload data according to the transmission frame structure having been communicated already using the announcement message 14 and device 2 (BTE1) and device 3 (BTE2) receive the transmission frames comprising the payload data, for example audio stream a3 for the left hearing aids (device 2) and audio stream a4 for the right hearing aids (device 3). These audio streams replace the audio streams a1 and a2, indicated in FIG. 2A.

During the time interval 11 (and the following time intervals) the network devices 2 and 3 can resume their communication via data channel d1 (which was established or ongoing at time interval 7), however now using the transmission frame structure which has been communicated from the broadcast device 1 using the announcement message 14, and using empty timeslots that are not used by the broadcast device 1. Thus, for communication between the network devices 2 and 3 the same transmission frame structure is used as is used for the broadcasting the payload data. In particular, the payload (audio) data may be transmitted from the broadcast device 1 to the network devices 2 and 3 during one or more payload timeslots within the transmission frames, whereas communication data between the network devices 2 and 3 may be transmitted during communication timeslots (possibly allocated by a network manager). Thereby, the new communication timeslots may be or will be different from the communication timeslots used within the previous transmission frame structure, as used in FIG. 2A. Thus, simultaneous communication between the network devices 2 and 3 and broadcasting payload data from the broadcast device 1 to the network devices 2 and 3 is enabled. In particular, the time period 8 during which the communication between the network devices 2 and 3 is disturbed due to the announcement message 14 can be shorter than for conventional methods. Transmission of the transmission frames comprising the broadcasted payload data is indicated by reference signs 17.

Figure 4:
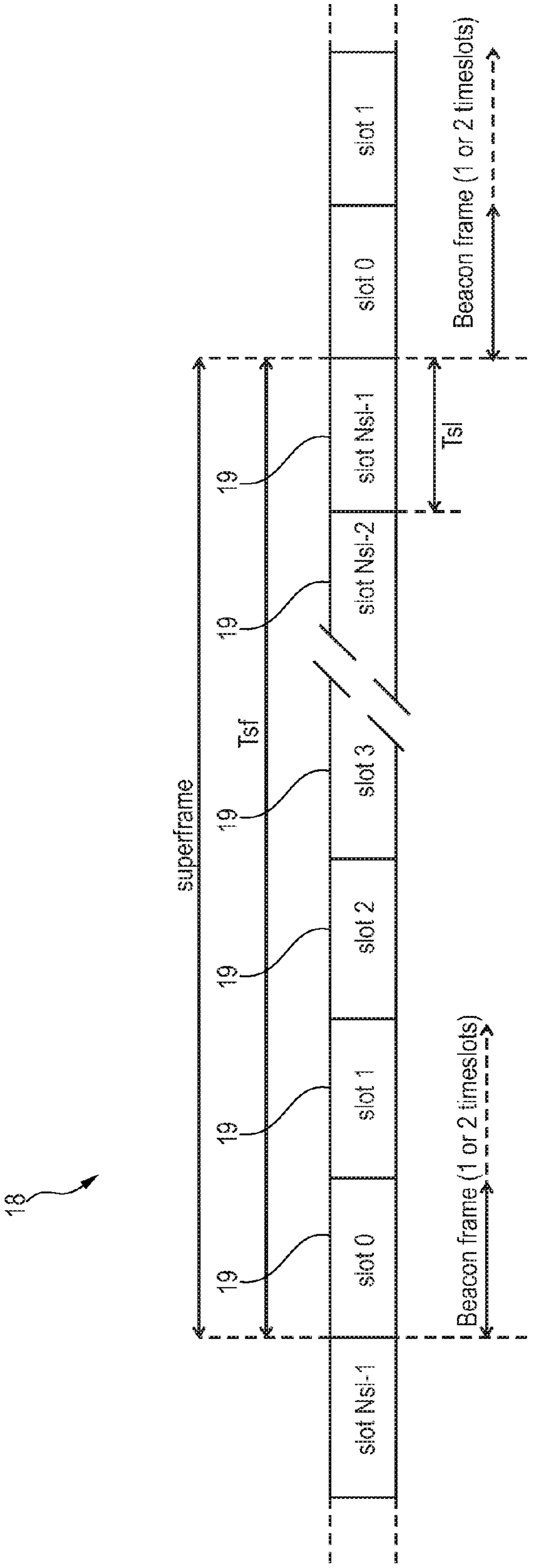
FIG. 4 schematically illustrates a transmission frame structure for communicating and/or broadcasting payload data according to an embodiment of the present invention.

FIG. 4 schematically shows a transmission frame structure (also referred to as superframe structure) 18 according to an embodiment of the present invention. The transmission frame 18 comprises a number of timeslots 19 (such as 256 or less or more timeslots). Slot 0 may for example comprise a beacon of one of the network devices 2, 3 or 4 indicating the presence of the respective network device. Slot 1 may for example comprise data communicated between network devices 2 and 3. Further communication data between other network devices may be transmitted during one or more other slots 19. Further, simultaneously with the communication going on between different network devices broadcasted payload data may be transmitted during one or more of the remaining slots 19 comprised within a transmission frame 18.

The structure (such as length, timeslot architecture and data types transmitted during different timeslots) may be imposed by the broadcast device 1 and may be included in the announcement message 14 transmitted from the broadcast device to the network devices. Thereby, the network devices may be appropriately configured for receiving the payload data transmitted during particular timeslots (defined within the announcement message 14) within the transmission frame 18. Thereby, broadcasting of payload data from the broadcast device 1 may be effectively achieved.

REFERENCE SIGNS

1 Broadcast device
2,3,4 Network devices
5 Transmission range of broadcast device
t2, t3, t4 Transmission ranges of network devices
7,8,9,10,11,12 Time intervals
13,15 Timeout period
14 Announcement message
17 Transmission frames comprising payload data
18 Transmission frame
19 Timeslot

The invention claimed is:

1. A method for preparing broadcasting payload data, the method comprising:

wirelessly transmitting a message from a broadcast device, the message containing configuration information of the broadcasting, wherein the message is receivable at a network device, wherein the configuration information includes a transmission frame structure, is extractable at the network device and includes data that is used by the network device and causes the network device to be configured for receiving at least a part of the broadcast payload data based on the configuration information and in the transmission frame structure, wherein the configuration information comprises information indicative of a start time at which the broadcasting starts, the start time being at a time after the message has been transmitted, and establishing a communication between the network device and a second network device according to the transmission frame structure, wherein the configuration information is used for configuring the network device by causing the network device to act based on a previous wireless communication with the second network device, the previous wireless communication having been performed according to a previous transmission frame structure different from the transmission frame structure.

2. A method for initiating broadcasting payload data, the method comprising: performing the method according to claim 1 by communicating the payload data between the broadcast device and the network device during timeslots, within a timeslot communication transmission frame structure, that are designated to the communication of the payload data while communicating data between the network device and another network device using other timeslots in the timeslot communication transmission frame structure.

3. The method according to claim 1, wherein the configuration information comprises information indicative of the transmission frame structure defining a repetitive structure of transmission frames according to which the payload data are to be broadcasted.

4. The method according to claim 3, wherein the transmission frame structure is indicative of one or more time intervals within the transmission frames at which the payload data are to be broadcasted by the broadcast device.

5. The method according to 3, wherein the communication between the network device and the second network device is wireless communication that is uses remaining timeslots not occupied by the payload data.

6. The method according to claim 5, wherein the configuration information is operable for configuring the network device by causing the network device to terminate the previous wireless communication with the second network device, the previous wireless communication having been performed according to the previous transmission frame structure different from the transmission frame structure.

7. The method according to claim 6, wherein the wireless communication is established such as to utilize a network configuration that has been used for the previous wireless communication.

8. The method of claim 5, wherein establishing the wireless communication between the network device and a second network device includes:

communicating the broadcast payload data, between said broadcast device that transmits the payload data and the network device, in particular timeslots designated to the payload data within the transmission frame structure, and while communicating the broadcast payload data, using other ones of the timeslots within the transmission frame structure to communicate data between the network device and the second network device.

9. The method according to claim 1, wherein the configuring the network device comprises synchronizing a clock of the network device according to the configuration information.

10. The method according to claim 1, wherein the broadcast device is located outside of a transmission range of the network device, and the network device is capable to wirelessly transmit a communication signal to be detected by a second network device.

11. A method for broadcasting payload data by a broadcast device, the method comprising: initiating broadcasting the payload data according to claim 1; and broadcasting the payload data from the broadcast device to the network device according to the configuration information.

12. The method according to claim 11, wherein the broadcasting the payload data comprises broadcasting the payload data according to the transmission frame structure, the transmission frames having a repetitive transmit structure derivable from the configuration information, wherein in particular the payload data are transmitted in at least one time interval within the transmission frames defined by the transmission frame structure.

13. The method of claim 1, wherein the configuration information includes information indicative of a transmission frame structure defining a repetitive structure of transmission frames according to which the payload data is to be broadcasted, each frame including timeslots designated to the payload data and other timeslots not designated to the payload data, further including:

communicating the payload data between the broadcast device that transmits the payload data and the network device in the timeslots designated to the payload data, and while communicating the payload data, communicating data between the network device and a second network device using the timeslots not designated to the payload data.

14. A broadcast device for broadcasting payload data, the broadcast device comprising: a transmitter for wirelessly transmitting a message from the broadcast device to a network device, the message containing configuration information of the broadcasting, wherein the broadcast device is configured and arranged to broadcast the payload data based on the configuration information, wherein the configuration information comprises information indicative of a start time at which the broadcasting starts, and wherein the broadcast device is configured to start broadcasting after transmitting the message, and to establish a communication between the network device and a second network device based on the configuration information, wherein the configuration information being configured for the network device by causing the network device to act based on a previous wireless communication with the second network device, the previous wireless communication having been performed according to a previous transmission frame structure different from a transmission frame structure associated with the message transmitted from the broadcast device to a network device.

15. An apparatus comprising:

a receiver configured and arranged to receive a message wirelessly transmitted from a first broadcast device;

a processor configured and arranged to extract configuration information of the broadcasting contained within the message; and a configuration mechanism in a network device that includes the receiver and processor, the configuration mechanism being configured and arranged to configure the network device for receiving payload data broadcasted by the broadcast device based on the configuration information, wherein the configuration information comprises information indicative of a start time at which the broadcasting starts, and wherein the network device is adapted to receive the broadcasting which is started by the broadcast device after transmitting the message and wherein the apparatus includes circuitry configured and arranged to communicate with a second broadcast device, to receive broadcasted payload data from the second broadcast device upon entering an operating area of the second broadcast device, in response to the network device moving out of communication range with the first broadcast device.

16. The apparatus of claim 15, wherein the configuration mechanism is configured and arranged to configure the network device for receiving the payload data and for communicating with a second network device, based on data in the configuration information indicative of the transmission frame structure defining a repetitive structure of transmission frames according to which the payload data is broadcasted, each frame including timeslots designated to the payload data and other timeslots not designated to the payload data, by:

receiving the payload data from the broadcast device in the timeslots designated to the payload data, and while receiving the payload data, communicating data with a second network device using the timeslots not designated to the payload data.

17. The apparatus of claim 16, further including the broadcast device, the broadcast device being configured and arranged with the network device to synchronize communications according to the transmission frame structure, and to transmit the payload in the timeslots designated to the payload data.

18. A method for preparing broadcasting payload data, the method comprising:

wirelessly transmitting a message from a broadcast device, the message containing configuration information of the broadcasting, wherein the message is receivable at a network device, wherein the configuration information includes a transmission frame structure, is extractable at the network device and includes data that is used by the network device and causes the network device to be configured for receiving at least a part of the broadcast payload data based on the configuration information and in the transmission frame structure, wherein the configuration information comprises information indicative of a start time at which the broadcasting starts, the start time being at a time after the message has been transmitted, wherein the transmission frame structure includes data identifying particular timeslots and communication message types to be transmitted within the timeslots, different ones of the timeslots being assigned to a particular type of data that is different than data types in other ones of the timeslots.

* * * * *